J. R. SNYDER.
TRIPLE VALVE FOR AIR BRAKE SYSTEMS AND ATTACHMENTS THEREFOR.
APPLICATION FILED DEC. 14, 1916. RENEWED FEB. 17, 1919.

1,302,986.

Patented May 6, 1919.
2 SHEETS—SHEET 1.

QUICK SERVICE POSITION

EMERGENCY POSITION

WITNESSES

INVENTOR
Jacob Rush Snyder
By Fred W. Winter
his attorney

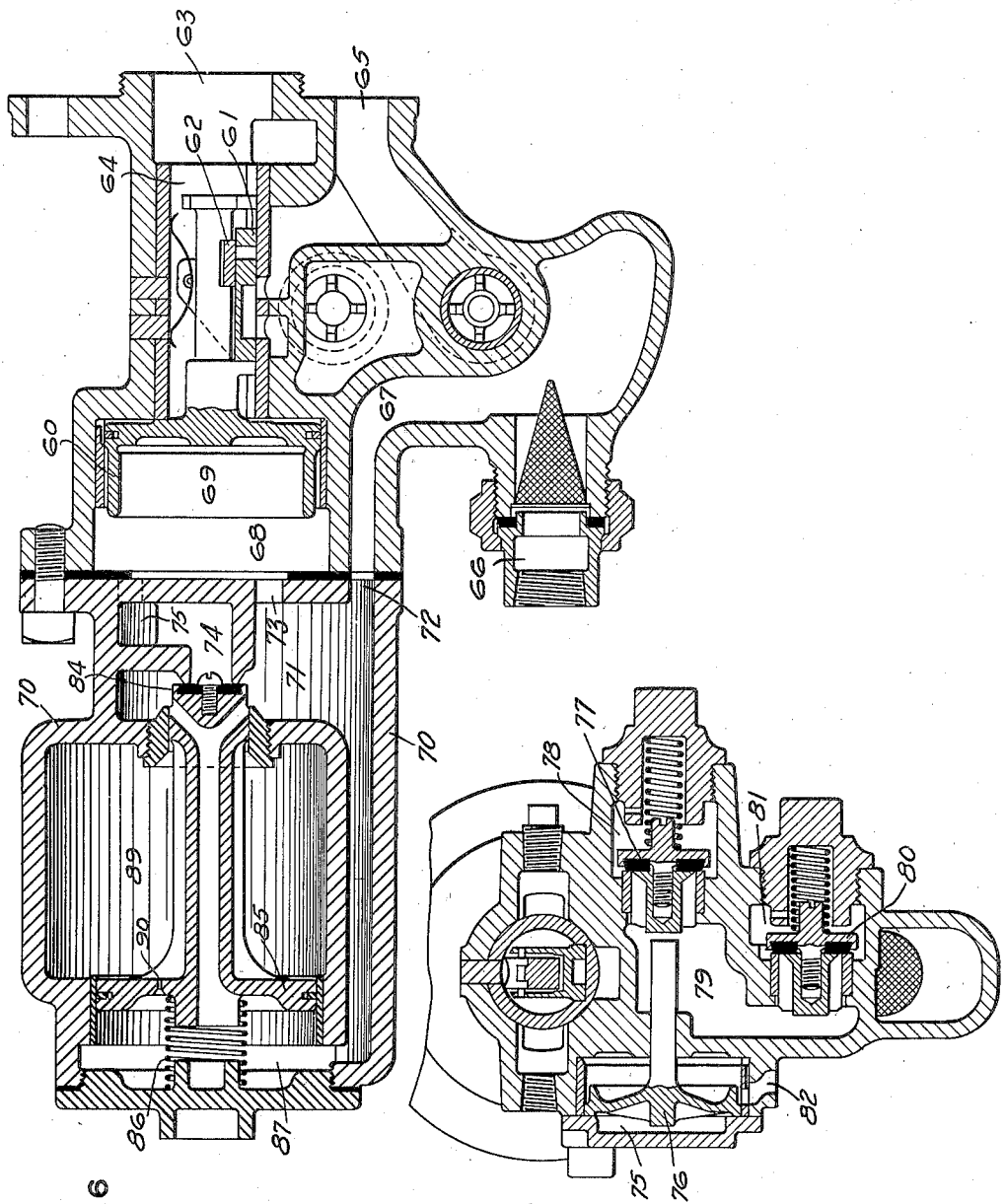

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

TRIPLE VALVE FOR AIR-BRAKE SYSTEMS AND ATTACHMENTS THEREFOR.

1,302,986.      Specification of Letters Patent.      Patented May 6, 1919.

Continuation of application Serial No. 847,732, filed June 27, 1914. This application filed December 14, 1916, Serial No. 136,922. Renewed February 17, 1919. Serial No. 277,653.

*To all whom it may concern:*

Be it known that I, JACOB RUSH SNYDER, a resident of Pittsburgh, in the county of Allegheny and State of Pennsylvania, have invented a new and useful Improvement in Triple Valves for Air-Brake Systems and Attachments Therefor, of which the following is a specification.

The invention relates to triple valves for air brake systems and attachments therefor.

The general object of the invention is to provide means for preventing undesired emergency action of triple valves.

Present forms of quick action triple valves for air brake systems are provided with emergency mechanism for securing quick or emergency application of the brakes when it is desired to stop a train suddenly, which mechanism is operated when the main abutment of the triple valve moves to emergency position.

With present triple valves for freight, passenger car and locomotive service, it frequently happens that the main abutment of the triple valve fails to move to service application position upon initial service reductions of train pipe pressure. This is due to a variety of causes, such as insufficient or imperfect lubrication, improperly fitted packing rings, binding of packing rings and piston, dirt in the valve, service port becoming entirely closed, and numerous other causes.

As a result of the failure of the main abutment to move upon initial service reduction of train pipe pressure, substantially the full auxiliary reservoir pressure is retained on the auxiliary reservoir side of the main abutment which, when the abutment does move under second or subsequent service reductions of train pipe pressure, moves the abutment over so violently that the standard graduating spring does not arrest its movement in service position, but permits it to move to emergency position.

When the main abutment is moved to emergency position under the conditions above set forth, the emergency mechanism will also be operated and an undesired emergency application of the brakes secured. This invariably results in pulling out of draw bars, buckling the train by reason of the sudden application of one of the brakes to one of the cars, or some other serious injury to the train.

One of the objects of the present invention is to provide a triple valve in which undesired quick action under service reductions in train pipe pressure is prevented without interfering with the desired quick action under emergency reductions in train pipe pressure.

Another object is to provide a triple valve having an emergency mechanism for venting the train pipe pressure to the brake cylinders which operates independently of the main movable abutment of the triple valve.

A further object is to provide a mechanism which may be readily attached to standard forms of triple valves without altering the construction thereof for preventing undesired quick action of said valves without interfering with the desired quick action under emergency conditions.

A further object is to provide an improved attachment for standard triple valves which may be substituted for the usual emergency mechanism thereof without altering the construction of the valve, said mechanism being adapted to secure desired quick action but prevent undesired quick action.

A further object is to provide an attachment for standard triple valves having mechanism arranged to be substituted for the usual emergency mechanism without altering the construction of the valve, which mechanism is responsive to train pipe pressure and which operates totally independent of the main movable abutment for securing quick action of the valve under emergency reductions in train pipe pressure but preventing undesired quick action under service reductions in train pipe pressure.

Other objects and advantages of the invention will appear from the following specification.

Embodiments of the invention are illustrated in the accompanying drawings. The views of the drawings are as follows:

Fig. 6 is a longitudinal section of another standard form of triple valve, showing the attachment applied thereto.

Fig. 7 is a cross section taken at right angles to the view of Fig. 6, showing the valve mechanism in normal release position.

Figure 1:
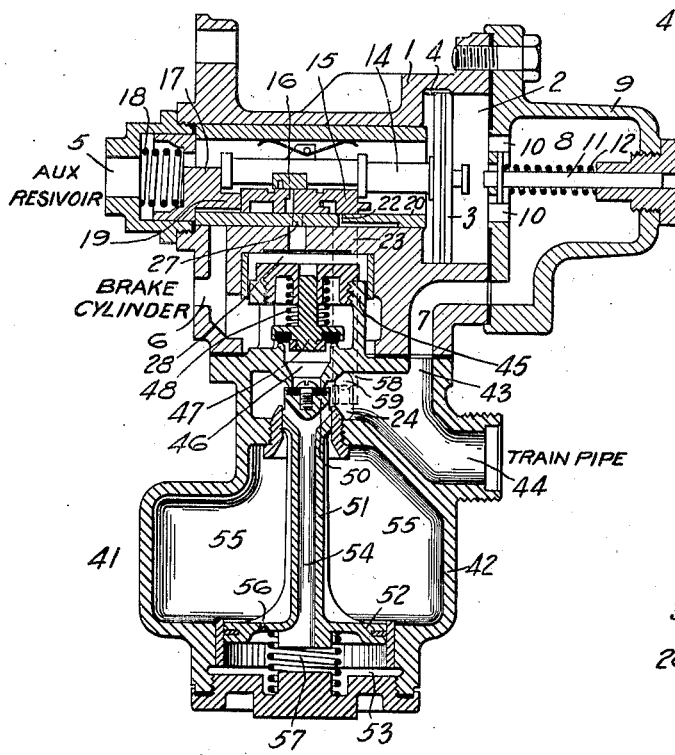
Figure 1 is a longitudinal section through a standard Westinghouse type-K of triple valve with the improved attachment applied thereto and showing the valve in normal release position, the section through the valve mechanism being taken on the line 1—1 of Fig. 3.

The mechanism herein shown is particularly adapted to be applied as an attachment to standard forms of triple valves by simply removing the usual emergency mechanism and, without altering the construction of the triple valve, substituting the attachment herein described. The mechanism of the attachment is arranged so that it does not depend upon the movement of the main abutment of the triple valve for its action and consequently will operate irrespective of the exact details of the main triple valve mechanism. The main triple valve mechanisms shown in the drawings are two standard types with which the attachment is adapted to operate, but other forms may be used if desired. It is to be understood, also, that entire triple valves may be built including the mechanism as a portion thereof, these triple valves being of any suitable construction.

The mechanism, which is substituted for the usual emergency mechanism of the valve illustrated in Fig. 1, is slightly shaded. In order to properly explain the operation thereof, the operation of the usual valve mechanism illustrated in the upper portion of Fig. 1, and in Figs. 2, 3 and 4 will first be described.

The triple valve shown comprises a casing 1 provided with a chamber 2 in which works the main movable abutment 3, the chamber being provided with the usual charging groove 4 through which the auxiliary reservoir is charged when the abutment 3 is in release position. This abutment actuates valve mechanism which controls various communications between the auxiliary reservoir, brake cylinder, train pipe, and atmosphere.

The auxiliary reservoir which furnishes pressure to the brake cylinders for applying the brakes is connected to the triple valve so as to communicate with the passage 5 and through it with the left hand side of the main abutment 3.

The brake cylinder is connected to the valve so as to communicate with the passage 6, connection between which and the auxiliary reservoir passage 5 is controlled by the valve mechanism operated by the main abutment 3.

The train pipe communicates through a passage 7 with a chamber 8 in the head 9 and through ports 10 with the chamber 2 so that the main abutment is subjected on one side to train pipe pressure, variations in which tend to cause it to move. Located in the head 9 is the usual graduating stem 11 acted upon by graduating spring 12.

The main abutment 3, through a stem 14, actuates the main slide valve 15 and the graduating valve 16. The graduating valve slides on the upper face of the main valve, the main valve having a lost motion connection with the stem 14, while the graduating valve has no such lost motion connection. The main slide valve is pushed from retarded release position to full release position by means of a slidable bushing 17 pressed inwardly by a spring 18 and provided with a projection 19 contacting with the main slide valve, as is usual in standard triple valves performing such functions.

Figure 2:
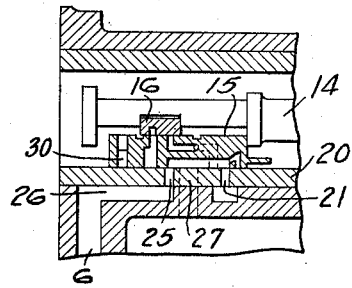
Fig. 2 is a fragmentary sectional view taken on the line 2—2 of Fig. 3.

In the normal release position of the triple valve, the main abutment and the valve mechanism actuated thereby are in the position shown in Fig. 1 and all the ports controlled by the valve mechanism are closed except the brake cylinder exhaust port which is open, the brake cylinder being thus exhausted and the brakes released. Assuming that the auxiliary reservoir is charged, the abutment is moved by reducing the pressure in the train pipe which permits the auxiliary reservoir pressure on the opposite side of the abutment to move it and thereby actuate the valve mechanism. When a service application of the brakes is desired, the train pipe pressure is reduced gradually by making what are known as service reductions in train pipe pressure. This causes the main abutment to be moved over slightly to actuate the valve mechanism to admit fluid pressure from the auxiliary reservoir to the brake cylinder to give an application of the brakes. Whenever the main abutment 3 is moved over suddenly to its extreme right hand position as by sudden emergency reductions of train pipe pressure, or by reason of some defect in the valve, the valve mechanism controlled by the abutment is moved so as to open full communication between the auxiliary reservoir and the brake cylinder, and also, in the usual mechanism, to admit auxiliary reservoir pressure to the emergency mechanism to cause said emergency mechanism to vent the train pipe to the brake cylinder. The construction of the valve mechanism is, in more detail, as follows:

The main slide valve operates upon a valve seat 20 shown in Fig. 2 which is provided with the following ports: an exhaust port 21 leading to the atmosphere, a small port 22 connecting through passage 23 with the train pipe passage 7, at 24, a port 25 communicating through passage 26 with the brake cylinder connection 6, and a port 27 communicating with the chamber 28 in which the piston of the emergency mechanism of the standard Westinghouse valve is located.

Figure 3:
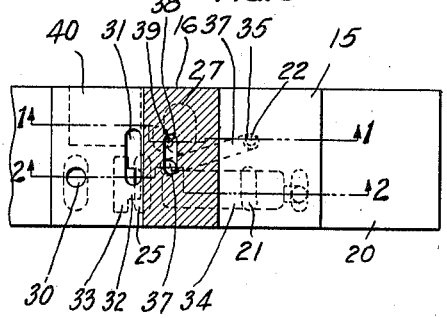
Fig. 3 is a plan view, showing the main valves in quick service position.

The main slide valve is provided with the usual ports and cavities of the standard Westinghouse K-type triple valve, namely, a small port 30 arranged, when the valve is in emergency position, to register with the brake cylinder port 25 and admit pressure from the auxiliary reservoir to the brake cylinder; a larger elongated port 31 of irregular form at the lower end, having a relatively narrow portion 32 and a relatively wider portion 33 both extending transversely of the valve and which port, in quick service position of the valve shown in Fig. 3, registers by its relative narrow portion 32 with the brake cylinder port 25, which in full service position the relative wide portion 33 of said port registers with the brake cylinder port 25. A large longitudinal cavity 34 is arranged so that when the valve is in release position, it connects the brake cylinder port 25 with the exhaust port 21, either for full or restricted release, full release position being shown by Figs. 1 and 2. A port 35 arranged in quick service position of the valve to register with the train pipe port 22 and communicating through passage 36 with a port 37 through the upper face of said valve, the latter port in quick service position of the valve being connected by the cavity 38 in the graduating valve with port 39 through the main valve, which in turn registers with the port 27, thereby venting the train pipe momentarily to brake cylinder; and a recess 40 extending in from the side face of the valve and arranged in emergency position, to partly overlap the port 27.

The valve mechanism so far described is the standard Westinghouse K-type triple valve and operates in the same way, having the usual positions of release, retarded release, quick service, full service, lap, and emergency, all of which are fully understood by those familiar with the art.

The emergency mechanism of the standard valve above described is located at the lower part thereof and includes a movable abutment operating in the chamber 28. This emergency mechanism remains inoperative until the main movable abutment moves the main triple valve mechanism to emergency position at which time pressure is admitted through the port 27 into chamber 28, which pressure operates the abutment in the chamber and actuates the emergency mechanism which vents the train pipe pressure in the passage 7 to passage 6 and the brake cylinders. The admission of pressure through the port 27 to operate the emergency mechanism occurs whenever the main abutment is moved to emergency position irrespective of whether it is moved to such position under emergency reductions or to other causes. If the main abutment fails to move under emergency reductions in train pipe pressure, the emergency mechanism will not be operated. On the other hand, if the main abutment moves to emergency position when such movement is not desired, the emergency mechanism will be operated and the brakes quickly and suddenly applied.

In applying the attachment herein disclosed, the usual emergency piston and valves together with the housing therefor, are bodily removed and there is substituted therefor a mechanism designated generally by the reference numeral 41, which acts as an emergency mechanism for the triple valve but which is constructed so that it will not operate when the main movable abutment moves to emergency position under service reductions in train pipe pressure. This attachment may be applied without in any way altering the construction of the main part of the triple valve. The usual emergency mechanism is simply removed and another housing containing the new mechanism is attached to the triple valve casing.

The attachment is arranged to normally close the passage between the train pipe and the brake cylinder, communication between such passages being controlled by a supplementary movable abutment which is subjected on one side to train pipe pressure and on the other side to a trapped pressure which may equalize with the train pipe pressure through a small feed groove or port. The supplementary abutment is not moved when service reductions in train pipe pressure are made, but when emergency reductions are made it is moved to establish communication between the train pipe and the brake cylinder passage to vent the train pipe pressure to the brake cylinder and secure an emergency application of the brakes. The movement of the supplementary abutment is independent, however, of the action of the main movable abutment.

The attachment comprises a housing or casing 42 adapted to be bolted or otherwise fastened to the main triple valve casing in the place of the usual housing for the emergency mechanism. This casing 42 has a passage 43 which registers with the passage 7 in the triple valve and communicates with a passage 44 which is connected to the train pipe. It also has a projection 45 which fits loosely within the chamber 28 of the main valve and so closes this chamber as to permit only a gradual flow of pressure therefrom into the brake cylinder passage 6 when air enters the chamber through port 27. The upper portion of the attachment is constructed so that communication as between the brake pipe and brake cylinder passage 6 is closed except for a port 46 which, when opened, establishes communication between the train pipe passage 44 and the brake cylinder passage 6. The port 46 is closed by a check valve 47 carried by the projection 44 and normally biased into engagement with its seat by the spring 48. This valve is subjected on one side to the brake cylinder pressure and the pressure of the spring 48 and is arranged to be operated by brake pipe pressure when such pressure is admitted to the under side thereof through port 46.

The port 46 in the attachment is normally closed by the valve 50 carried by the upper end of the stem 51 of a supplementary movable abutment 52. This abutment is subjected on one side to train pipe pressure in a chamber 53, said pressure being admitted through the passage 54 in the stem 51 of the abutment. On its opposite side the abutment is subjected to a trapped pressure in the chamber 55 said pressure being supplied from the chamber 53 and train pipe through the equalizing port 56. The abutment is also subjected on its lower face to the pressure of a spring 57 which, when the pressure in the chamber 55 is equal to the train pipe pressure, biases the abutment upward and normally closes the port or passage 46.

The attachment is also provided with an opening or passage 58 which registers with the passage 23 in the main triple valve and opens into the passage 44. A ball check valve 59 opening away from the passage 44 is located in the passage 58 for a purpose hereinafter explained.

The attachment operates as follows:—

When the triple valve is in release position, the trapped pressure in the chamber 55 equalizes through port 56 with the train pipe pressure and the spring 57 biases the abutment to cause the valve 50 to close the port 46 leading to the brake cylinder. It will be understood that valve 50 is also held on its seat by the force of train pipe pressure against the area of stem 51 equivalent to the seating surface, or area, of said valve.

When a service reduction is made, the pressure in chamber 55 equalizes with the reduced train pipe pressure and the supplementary movable abutment 52 remains in its normal position. It maintains this position irrespective of whether or not the main movable abutment moves to emergency position since the admission of pressure to the port 27 does not effect the operation of the emergency mechanism, such port becoming in effect merely an auxiliary port to establish communication between the auxiliary reservoir and the brake cylinder and between the train pipe and brake cylinder.

When an emergency reduction in train pipe pressure is made, the pressure in chamber 55 can not equalize with the train pipe pressure with sufficient rapidity and consequently the abutment 52 is moved by the trapped pressure in chamber 55 and valve 50 is moved off its seat, permitting train pipe pressure in passage 44 to reach the check valve 47 and unseat it so that communication is established between the train pipe and passage 6 to the brake cylinder. Consequently under emergency reductions in train pipe pressure, the train pipe pressure is automatically vented to the brake cylinder. As soon as the brake cylinder pressure and the train pipe pressure equalize, check valve 47 is closed by spring 48. In the meantime pressure in chamber 55 has equalized with the train pipe pressure, and abutment 52 is moved by spring 57 into normal position, closing port 46.

It will thus be seen that mechanism of the attachment is operated by variations in train pipe pressure irrespective of the movement of the main abutment of the triple valve. When service reductions in train pipe pressure are made, the emergency mechanism is not operated even though the main abutment may be moved to emergency position. When, however, emergency reductions in train pipe pressure are made, the emergency mechanism operates irrespective of the movement of the main abutment.

The operation of the triple valve as a whole is as follows:—

Normally the parts are in the position shown in Fig. 1 with train pipe pressure in the chamber 2 equalized through charging groove 4 with the auxiliary reservoir pressure on the opposite side of the main abutment 3 and also equalized through the port 56 with the chamber 55 on the upper face of the supplementary abutment 52. The brake cylinder port 25 is connected to the exhaust port 21 by the main valve mechanism, while all other ports are blanked or closed.

Upon service reductions in train pipe pressure the auxiliary reservoir pressure moves the main abutment 3 and the valve mechanism connected thereto to connect the auxiliary reservoir to the brake cylinder through the relatively large port 25 shown in Fig. 2, thereby securing a service application of the brakes. This port 25 is lapped or closed by the graduating valve in the usual manner after the auxiliary reservoir pressure has equalized with the reduced train pipe pressure.

Under these conditions the emergency mechanism of the attachment herein disclosed is not operated because the equalizing port 56, through the supplementary abutment 52, is of sufficient size to permit the pressure in chamber 55 to equalize with the train pipe pressure as rapidly as the latter is reduced. The pressures on the two faces of the supplementary abutment 52 are thus equalized and the abutment does not move no matter how many times the train pipe pressure may be reduced by service reductions and entirely irrespective of whether or not the main movable abutment 3 moves. In other words, as long as the reductions in train pipe pressure are slow or gradual, as in service applications, the abutment 52 which controls communication between the train pipe and the brake cylinder, will not move. Consequently, even though the main movable abutment sticks during the first or second service reductions of train pipe pressure and moves over violently upon a third or later service reduction, no movement of the supplementary abutment can occur and accordingly no evacuation of the train pipe pressure to the brake cylinder and undesired quick action of the brakes can occur.

In quick service position, the abutment 3 is moved over to cause the valve mechanism to occupy the position shown in Fig. 3. In this position the port 31 in the main valve registers with the port 25 in the valve seat and the graduating valve uncovers the port 31 so that communication is established between the auxiliary reservoir and the brake cylinder through the comparatively small port 31 and the port 25.

Also, in this position communication is established from the train pipe past the check valve 59 of the attachment through the passages 58 and 23, the port 22, passage 36 in the main slide valve, port 38 in the graduating valve, and port 39 in the main valve with port 27 leading to the chamber 28. As hereinbefore stated, an abutment controlling the emergency mechanism is located in the chamber 28 in the present standard form of triple valve. This abutment works loosely in the chamber so that the train pipe pressure admitted through port 27 may pass around the same without operating it to cause the emergency mechanism to be actuated. If, however, the passage around this abutment should become clogged for any reason the train pipe pressure admitted through the port 27 will actuate the abutment and operate the emergency mechanism to give an undesired emergency application under quick service reductions in train pipe pressure. This in fact frequently occurs.

With the present improvement, however, the train pipe pressure admitted through the port 27 into the chamber 28 can not operate the emergency mechanism because no part of the emergency mechanism is responsive to the pressure in chamber 28. It merely passes around the loosely fitted extension 45 of the attachment to the brake cylinder.

The relatively rapid reduction in train pipe pressure under quick service reductions is not sufficient to actuate the supplementary abutment 52, the feed port 54 being made of sufficient size to permit the pressure in the chamber 55 to equalize with the train pipe pressure and permit movement of the abutment.

Under quick service reductions in train pipe pressure, the main valve mechanism connects the train pipe with the brake cylinder through a restricted passage, as hereinbefore explained, and at the same time the brake cylinder is in communication with the auxiliary reservoir. If after the auxiliary reservoir, the brake cylinder and the train pipe pressure have equalized, the train pipe pressure is further reduced by making a further reduction or by leakage, there would be a tendency for pressure to flow from the brake cylinder back to the train line. This flow is prevented, however, by the ball check valve 59 shown in Fig. 1, which, while it permits pressure to flow from the train pipe to the main valve mechanism and the brake cylinder, prevents the flow of pressure in the opposite direction.

It will thus be seen that with the present attachment the emergency mechanism can not be operated under quick service reductions in train pipe pressure, whereas the former mechanism was subject to operation whenever the space around the emergency piston in the chamber 28 became clogged so that the train pipe pressure could not flow freely to the brake cylinder.

Figure 4:
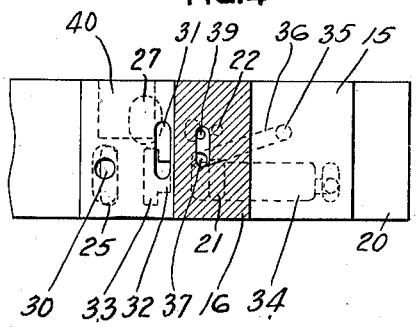
Fig. 4 is a view similar to Fig. 3, showing the main valves in emergency position.

When the train pipe pressure is suddenly reduced, such as at the time of bursting a hose or by making emergency reductions in train pipe pressure, the abutment 3 moves outwardly to the limit of its travel and moves the valve mechanism to emergency position, shown in Fig. 4, in which position the auxiliary reservoir is connected to the brake cylinder through the port 27. The auxiliary reservoir pressure admitted through the port 27 operates the emergency mechanism in the present standard valves, but in the attachment herein disclosed this pressure merely passes into chamber 28 and through the rather restricted area around extension 45 to the brake cylinder. This restricted area is such as to give the train pipe pressure full opportunity to vent to the brake cylinder, such venting being secured by reason of the fact that the pressure in chamber 55 can not equalize through feed port 56 with the train pipe pressure with sufficient rapidity so that the supplementary abutment is moved downwardly, thereby unseating valve 50 and permitting train pipe pressure to rush through the opening 46, lift the check valve 47 and pass to the brake cylinder, thereby securing the necessary local reduction in train pipe pressure to give the quick emergency action desired.

After emergency application, and as soon as the train pipe pressure equalizes with the brake cylinder pressure, the spring 48 moves the check valve 47 back to normal position and the pressure in chamber 55 having equalized with the brake pipe pressure, the spring 57 moves the supplementary abutment 52 back to normal position.

Figure 5:
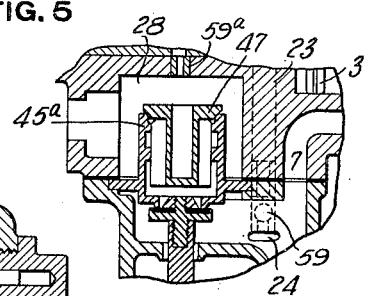
Fig. 5 is a fragmentary sectional view of an alternative construction of the emergency mechanism.

Fig. 5 shows an alternative construction in which, instead of almost closing the chamber 28 by the upper portion of the attachment, the chamber is left in free communication with the brake pipe passage 6, the check valve 47 being in this instance supported by a projection 58 extending into the chamber 28. For the purpose of preventing too rapid a flow of pressure through the port 27 when said port is open in quick service positions of the main triple valve mechanism to admit train pipe pressure to the brake cylinder, the port is choked by a sleeve 59 which provides a restricted passage from the port 27 to the chamber 28. The other parts of the emergency mechanism operate in the same manner as those previously described and further explanation is therefore not necessary.

A modified form of the attachment which is adapted to be applied to another standard form of triple valve is shown in Figs. 5 and 6.

The triple valve illustrated in these figures has a main movable abutment 60 operating the main slide valve 61 and the graduating valve 62 in the usual manner.

The auxiliary reservoir is connected to the passage 63 which communicates through the opening 64, in which the valve mechanism is located, with one side of the main movable abutment.

The brake cylinder is connected so as to communicate with the passage 65, connection between which and the auxiliary reservoir is controlled by a main valve mechanism.

The train pipe is connected at the point 66 and communicates through the passage 67 with the chamber 68 on the opposite side of the main movable abutment 60.

In this standard form of triple valve, the emergency mechanism is attached to the left hand side of the valve casing and includes an abutment operating in the chamber 69 inside of the main movable abutment, a flange member having cavities communicating with the triple valve, and valve mechanism operated by the abutment or piston which is located within the main abutment. Whenever the main movable abutment is suddenly moved, as in emergency reductions in train pipe pressure, the abutment which operates inside of it is also moved to operate the emergency mechanism. When the main abutment moves slowly under service reductions, the supplementary abutment is not moved. If, however, the main abutment moves suddenly after a second or subsequent service reduction when it has stuck or failed to move on the first service reduction, the supplementary abutment is also moved and undesired emergency action is obtained.

In applying the attachment herein disclosed, the old emergency mechanism together with the chambered flange and the supplementary abutment which operates inside of the main movable abutment is bodily removed and the attachment substituted as a unit without in any way altering the construction of the triple valve mechanism. In fact, a complicated mechanism is removed and a simple mechanism substituted for effecting emergency action when desired, but positively preventing such action when undesired.

The attachment comprises a housing 70 which is adapted to be bolted or otherwise fastened to the triple valve by the use of the same screw threaded openings or fastening means employed to attach the usual emergency mechanism. The housing has a passage 71 provided with an opening 72 which registers with the train pipe passage 67 and also with through ports 73 which establish communication with the chamber 68 in which the main abutment of the triple valve operates. The chamber 71 also communicates through the passages 74 and 75, with the opposite side of a movable abutment 76 shown in Fig. 7, which, when operated, causes an emergency application of the brakes by moving a check valve 77 off its seat and allowing auxiliary reservoir pressure in the chamber 78 to pass to the chamber 79 and raise the check valve 80 off its seat, thereby venting the auxiliary reservoir pressure in chamber 78 to the brake cylinder passage 81 and permitting the train pipe pressure to exhaust to atmosphere through the port 82.

The passage 74 is normally closed by a valve 84 which is held in position by a supplementary movable abutment 85 normally biased by the spring 86 into position shown. This supplementary abutment is subjected on one side to train pipe pressure in the chamber 87, train pipe pressure being furnished through passage 88 communicating with chamber 71. A second passage 88$^a$ is provided between the chamber 71 and the chamber 87, such passage not only serving the purpose of permitting the air to pass from chamber 71 to chamber 87 but also acting as a drainage passage for draining any condensed moisture from the chamber 87 through the chamber 71 and the passage 67 to the triple valve, from which it is discharged. If desired, one of these passages may be dispensed with, but the structure shown has been found desirable because it provides passages of ample size between the chambers and also provides for drainage of moisture from the chamber 87. The opposite side of the piston is subjected to a trapped pressure in chamber 89 which is normally equalized with the brake pipe pressure through the feed port 90.

The operation of the mechanism is as follows:—

Under service reductions in train pipe pressure, the pressure in the chamber 89 equalizes with the train pipe pressure so that the supplementary abutment is not moved by such reductions in pressure and consequently the passage 74 leading to the abutment 76 is not opened and the emergency mechanism remains inoperative. In case the main abutment 60 of the triple valve should suddenly move to emergency position under service reductions of train pipe pressure, such action has no effect upon the supplementary abutment 85 and can not cause the emergency mechanism to go to emergency position because operation of the emergency mechanism is not dependent upon the movement of the main abutment. The result is that even though the main triple piston may stick and subsequently move suddenly, an emergency application of the brakes will not take place.

If, however, an emergency reduction in train pipe pressure is made, the pressure in chamber 89 can not equalize with the train pipe pressure with sufficient rapidity and consequently the supplementary abutment 85 will be moved to unseat the valve 84 and permit the train pipe pressure to pass through the passages 74 and 75 and move the abutment 76 to vent the auxiliary reservoir pressure to the brake cylinders and also to vent the train pipe pressure to atmosphere through the port 82. The usual emergency application will thereby be secured under emergency reductions in train pipe pressure.

It will thus be seen that an attachment has been provided which may be applied to standard forms of triple valves without altering the construction of such valves by simply removing a portion of their mechanism and substituting the mechanism herein disclosed. The attachment is simple, it may be easily applied and operates only in response to variations in train pipe pressure and totally independent of the action of the main movable abutment. When emergency reductions of train pipe pressure are made, the mechanism operates positively to cause emergency action, but when service reductions in train pipe pressure are made, the mechanism does not operate even though the main abutment may stick and subsequently move suddenly to emergency position.

The advantages of such a structure in preventing "kicking" or "dynamiting" of air brakes on a train with ensuing damage, will be obvious. Moreover, in case the main abutment should fail to move for some abnormal reason under emergency reductions in train pipe pressure, the attachment will nevertheless vent the train pipe pressure so that the main abutment must certainly be moved, and furthermore the train pipe pressure will be reduced so that emergency action of succeeding triple valves will not be interfered with. In the old mechanisms, if the main abutment should stick under emergency reductions, no application of the brakes would be secured and the train pipe would not be vented.

The expression "triple valve" as used herein is intended to include the usual triple, control and distributing valve which is generally termed the "triple valve" in air brake systems.

This application is a continuation of an application of Jacob Rush Snyder, Serial No. 847,732, filed June 27, 1914.

It is to be understood that the structure shown is for purposes of illustration only and that other structures may be devised which come within the spirit and scope of the appended claims.

What is claimed is:—

1. An attachment for standard triple valves which have emergency mechanism for venting the train pipe pressure, comprising a mechanism adapted to be applied to the triple valve and to be substituted for the usual emergency mechanism without altering the construction of the triple valve, said substituted mechanism being subject directly to train pipe pressure and operating independently of the main movable abutment and its valve mechanism and arranged to vent the train pipe pressure upon emergency reductions in train pipe pressure but to prevent such venting under other reductions in train pipe pressure.

2. An attachment for standard triple valves which have emergency mechanism for venting the train pipe pressure comprising a mechanism adapted to be applied to the triple valve and substituted for the usual emergency mechanism without altering the construction of the triple valve, said substituted mechanism being subject directly to train pipe pressure and operating independently of the main movable abutment and arranged to vent the train pipe pressure directly to the brake cylinder upon emergency reductions in train pipe pressure but to prevent such venting under other reductions in train pipe pressure.

3. An attachment for triple valves which are provided with a main movable abutment for operating the valve mechanism and with an emergency mechanism for venting the train pipe pressure comprising a mechanism adapted to be applied to the triple valve and substituted for the usual emergency mechanism without altering the construction of the triple valve, said substituted mechanism including an actuating abutment subject on one side to train pipe pressure and on the other side to a trapped pressure so that upon emergency reductions in train pipe pressure the abutment is moved by the trapped pressure to operate the emergency mechanism to vent the train pipe pressure, said abutment being also arranged so that the trapped pressure may equalize with the train pipe pressure under service reductions in train pipe pressure to thereby prevent movement of the abutment and actuation of the emergency mechanism under service reductions.

4. An attachment for triple valves which are provided with a main movable abutment for operating the usual valve mechanism and with an emergency mechanism for venting the train pipe pressure comprising a mechanism adapted to be applied to the triple valve and substituted for the usual emergency mechanism without altering the construction of the triple valve, said mechanism including an actuating abutment subject on one side to train pipe pressure and on the other side to a trapped pressure, whereby upon emergency reductions in train pipe pressure the abutment is moved by the trapped pressure to vent the train pipe pressure directly to the brake cylinder, said abutment being also arranged so that the trapped pressure may equalize with the train pipe pressure under service reductions in train pipe pressure whereby the abutment is not moved to actuate the emergency mechanism under service reductions in train pipe pressure irrespective of the action of the main movable abutment of the triple valve.

5. An attachment for standard triple valves which have emergency mechanism for venting the train pipe pressure, comprising a mechanism adapted to be applied to the triple valve and substituted for the usual emergency mechanism without altering the construction of the triple valve, said substituted mechanism being subject directly to train pipe pressure and operating independently of the main movable abutment and its valve mechanism and arranged to vent the train pipe pressure upon emergency reductions in train pipe pressure but to prevent such venting under other reductions in train pipe pressure, and after operation under emergency conditions to automatically return to normal position irrespective of train pipe pressure.

6. An attachment for standard triple valves which have emergency mechanism for venting the train pipe pressure, comprising a mechanism adapted to be applied to the triple valve and substituted for the usual emergency mechanism without altering the construction of the triple valve, said substituted mechanism being subject directly to train pipe pressure and operating independently of the main movable abutment and its valve mechanism, and arranged to vent the train pipe pressure directly to the brake cylinder upon emergency reductions in train pipe pressure but to prevent such venting under other reductions in train pipe pressure, and after operation under emergency conditions to automatically return to normal position without requiring an increase in train pipe pressure for such action.

7. The combination with a triple valve, of an emergency attachment adapted to be applied thereto in place of the usual emergency mechanism and arranged to vent the train pipe pressure upon sudden reductions in said pressure but to prevent such venting under service reductions in train pipe pressure irrespective of the action of the main abutment of the triple valve and being also arranged to return to normal position after operation under emergency conditions without requiring changes in train pipe pressure.

8. The combination with a triple valve, of an emergency attachment adapted to be applied thereto and substituted for the usual emergency mechanism and arranged to vent the train pipe pressure to the brake cylinder upon sudden reductions in train pipe pressure but to prevent such venting under service reductions in train pipe pressure irrespective of the action of the main abutment of the triple valve and being further arranged to automatically return to normal position after operation under emergency conditions and after the train pipe pressure has equalized with the brake cylinder pressure without requiring changes in train pipe pressure for such action.

9. The combination with a triple valve, of an emergency attachment applied thereto and substituted for the usual emergency mechanism without reconstructing the valve and arranged to be operated directly by train pipe pressure independently of the main triple valve mechanism whereby upon emergency reductions in train pipe pressure said pressure is vented but upon service reductions in train pipe pressure such pressure is not vented irrespective of the action of the main abutment of the triple valve.

10. The combination with a triple valve of an emergency mechanism comprising a supplementary movable abutment arranged to vent the train pipe pressure and being subject on one side directly to train pipe pressure and on the other side to a trapped pressure whereby upon emergency reductions in train pipe pressure the abutment is moved to vent the train pipe pressure, said mechanism being arranged so that the trapped pressure equalizes with the train pipe pressure upon service reductions in train pipe pressure whereby the abutment is prevented from moving under service reductions irrespective of the action of the main abutment of the triple valve.

11. An attachment for standard triple valves which have emergency mechanism for venting the train pipe pressure to the brake cylinder of an air brake system, comprising a housing adapted to be applied to the triple valve without altering the construction thereof, said housing containing mechanism arranged to be substituted for the emergency mechanism of the triple valve for venting the train pipe pressure to the brake cylinders upon emergency reductions in train pipe pressure but preventing such venting under other reductions of train pipe pressure.

12. An attachment for triple valves which are provided with a main movable abutment for operating the usual valve mechanism and with an emergency mechanism for venting the train pipe pressure to the brake cylinder, comprising a housing adapted to be applied to the triple valve without altering the construction thereof, said housing containing mechanism arranged to be substituted for the emergency mechanism of the triple valve, said mechanism being responsive directly to variations in train pipe pressure and operating totally independently of the main movable abutment and its valve mechanism, whereby upon emergency reductions in train pipe pressure the mechanism is operated to vent the train pipe pressure to the brake cylinder but, upon service reductions the mechanism is not operated, irrespective of the action of the main movable abutment and its mechanism.

13. An attachment for standard triple valves which have emergency mechanism for venting the train pipe pressure to the brake cylinder of an air brake system, comprising a housing adapted to be applied to the triple valve housing without altering the construction thereof, said housing containing mechanism arranged to be substituted for the emergency mechanism, said substituted mechanism including an abutment subject on one side to the train pipe pressure and on the other side to a trapped pressure so that upon emergency reductions in train pipe pressure the abutment is moved by the trapped pressure to vent the train pipe pressure to the brake cylinder, said abutment being arranged to equalize the trapped pressure with the train pipe pressure under service reduction so that the abutment is not moved under service reductions.

14. An attachment for standard triple valves which are provided with emergency mechanism for venting the train pipe pressure to the brake cylinder of an air brake system, comprising a housing adapted to be applied to the triple valve without altering the construction thereof, said housing containing mechanism arranged to be substituted for the emergency mechanism, said mechanism comprising a movable abutment controlling a direct communication between the train pipe and the brake cylinder, said abutment being subject on one side to train pipe pressure and on the other side to a trapped pressure, whereby upon sudden reductions in train pipe pressure the abutment is moved by the trapped pressure to vent the train pipe pressure to the brake cylinder, said abutment being also arranged to equalize the trapped pressure with the train pipe pressure upon service reductions in train pipe pressure to prevent the movement of the abutment under service reductions.

15. An attachment for standard triple valves which have emergency mechanism for venting the train pipe pressure to the brake cylinder of an air brake system, comprising a housing adapted to be applied to the triple valve without altering the construction thereof, said housing containing mechanism arranged to be substituted for the emergency mechanism, said mechanism comprising a check valve controlling a direct communication between the train pipe and brake cylinder, said check valve being normally biased to prevent such communication but being operable by train pipe pressure to establish the communication, a movable abutment for preventing train pipe pressure from reaching said check valve, said abutment being subject on one side to train pipe pressure and on the other side to a trapped pressure whereby upon sudden reductions in train pipe pressure the movable abutment is actuated by the trapped pressure to permit the train pipe pressure to reach the check valve to operate it to vent the train pipe pressure to the brake cylinder, said movable abutment being arranged so as to equalize the trapped pressure with the train pipe pressure under service reductions in train pipe pressure to prevent operation of the mechanism under service reductions.

16. An attachment for standard triple valves which have emergency mechanism for venting the train pipe pressure, comprising a mechanism adapted to be applied to the triple valve and to be substituted for the usual emergency mechanism without altering the construction of the triple valve, said substituted mechanism being subject directly to train pipe pressure and operating independently of the main movable abutment and its valve mechanism and arranged to vent the train pipe pressure upon emergency reductions in train pipe pressure but to prevent such venting under other reductions in train pipe pressure, said attachment being also provided with means for preventing the flow of pressure from the brake cylinder to the train pipe when the main valvular mechanism is in quick service position.

17. The combination with a triple valve of an emergency mechanism including a supplementary abutment arranged to operate the mechanism to vent the train pipe pressure to the brake cylinder, said abutment being subject on one side directly to train pipe pressure and on the other side to a trapped pressure whereby upon sudden reductions in train pipe pressure the abutment is moved by the trapped pressure to vent the train pipe to the brake cylinder, after which it automatically returns to normal position irrespective of train pipe pressure, said abutment being also arranged so that the trapped pressure equalizes with the train pipe pressure under service reductions in train pipe pressure whereby movement of the abutment is prevented under service reductions irrespective of the action of the main abutment of the triple valve.

18. An attachment for triple valves which have emergency mechanism for venting the train pipe pressure to the brake cylinder comprising a mechanism arranged to be substituted for the emergency mechanism and to be applied to the triple valve without altering the construction thereof, said mechanism including a check valve normally biased to prevent communication between the train pipe and brake cylinder but arranged to be operated by train pipe pressure to establish such communication, a movable abutment for preventing train pipe pressure reaching the check valve, said abutment being subject on one side to train pipe pressure and on the other side to a trapped pressure, whereby upon sudden reductions in train pipe pressure the abutment is moved by the trapped pressure to allow the train pipe pressure to reach the check valve to open it to vent the train pipe pressure to the brake cylinder, said movable abutment being arranged so that the trapped pressure behind it equalizes with the train pipe pressure upon service reductions in train pipe pressure to thereby prevent operation of the emergency mechanism under service reductions in train pipe pressure.

19. A triple valve having a main movable abutment controlling the usual valve mechanism, an emergency mechanism for venting the train pipe pressure, said mechanism being responsive directly to train pipe pressure and operating independently of the main movable abutment and being arranged to vent the train pipe pressure upon emergency reductions in train pipe pressure and subsequently automatically returns to normal position irrespective of train pipe pressure, but to prevent such venting under service reductions in train pipe pressure irrespective of the action of the main movable abutment.

20. A triple valve having a main movable abutment controlling the usual valve mechanism, an emergency mechanism controlling a vent for the train pipe pressure, said mechanism having an actuating abutment subject on one side directly to train pipe pressure and on the other side to a trapped pressure, whereby upon emergency reductions in train pipe pressure the abutment is actuated by the trapped pressure to operate the mechanism to vent the train pipe pressure, after which it automatically returns to normal position irrespective of train pipe pressure, said abutment being also arranged so that the trapped pressure equalizes with the train pipe pressure under service reductions in train pipe pressure so that the abutment is not moved under service reductions in train pipe pressure irrespective of the action of the main movable abutment.

21. A triple valve having a main movable abutment controlling the usual valve mechanism, an emergency mechanism controlling a direct communication between the train pipe and the brake cylinder, said mechanism being responsive directly to train pipe pressure and operating totally independently of the main movable abutment and being arranged to vent the train pipe pressure to the brake cylinder upon emergency reductions in train pipe pressure and then to automatically return to normal position irrespective of train pipe pressure, but to prevent such venting under service reductions in train pipe pressure irrespective of the action of the main movable abutment.

22. A triple valve having a main movable abutment controlling the usual valve mechanism, an emergency mechanism controlling a direct communication between the train pipe and the brake cylinder, said mechanism having an actuating abutment subject on one side directly to train pipe pressure and on the other side to a trapped pressure whereby upon emergency reductions in train pipe pressure the abutment is actuated by the trapped pressure to operate the mechanism to vent the train pipe pressure to the brake cylinder, after which it automatically returns to normal position irrespective of train pipe pressure, said abutment being also arranged so that the trapped pressure equalizes with the train pipe pressure under service reductions in train pipe pressure so that the abutment is not moved under service reductions irrespective of the action of the main movable abutment.

23. A triple valve having a main movable abutment for operating the usual valve mechanism, an emergency mechanism controlling a direct communication between the train pipe and brake cylinder, said mechanism comprising a check valve normally biased to prevent communication between the train pipe and brake cylinder but arranged to be operated by train pipe pressure to establish such communication, a supplementary abutment arranged to prevent train pipe pressure reaching the check valve, said abutment being subject on one side directly to train pipe pressure and on the other side to a trapped pressure, whereby upon sudden reductions in train pipe pressure the abutment is moved by the trapped pressure to permit the train pipe pressure to operate the check valve to vent the train pipe pressure to the brake cylinder, after which the mechanism automatically returns to normal position irrespective of train pipe pressure, said supplementary abutment being also arranged so that the trapped pressure equalizes with the train pipe pressure under service reductions in train pipe pressure to prevent operation of the supplementary abutment and the emergency mechanism under service reductions in train pipe pressure.

24. A triple valve having a main movable abutment actuated by variations in train pipe pressure, a valve mechanism actuated by said abutment and arranged so that upon quick service reductions in train pipe pressure it vents the train pipe through a passage of relatively small size, means operating independently of the main abutment and valve mechanism arranged to be actuated by sudden reductions in train pipe pressure to vent the train pipe through a relatively large passage, said means being arranged to close said large passage upon equalization of train pipe pressure with the pressure in the chamber to which the train pipe is vented.

25. A triple valve having a main movable abutment actuated by variations in train pipe pressure, a valve mechanism actuated by said abutment and arranged so that upon quick service reductions in train pipe pressure it vents the train pipe to the brake cylinder through a restricted passage, and means operating independently of the main movable abutment and valve mechanism arranged to be actuated by sudden reductions in train pipe pressure to vent the train pipe to the brake cylinder through a large passage and upon equalization of brake cylinder pressure with train pipe pressure to close said passage.

26. A triple valve having a main movable abutment actuated by variations in train pipe pressure, a valve mechanism actuated by said abutment and arranged so that upon quick service reductions in train pipe pressure it vents the train pipe to the brake cylinder through a restricted passage, means operating independently of the main abutment and its valve mechanism arranged to be actuated by sudden reductions in train pipe pressure to vent the train pipe pressure to the brake cylinder through a large passage, and means arranged to close said large passage upon equalization of train pipe and brake cylinder pressures.

27. A triple valve having a main movable abutment actuated by variations in train pipe pressure, a valve mechanism actuated by said abutment and arranged so that upon quick service reductions in train pipe pressure it vents the train pipe to the brake cylinder through a restricted passage, means operating independently of the main abutment and valve mechanism arranged to be actuated by sudden reductions in train pipe pressure to vent the train pipe to the brake cylinder through a relatively large passage, and a check valve device subject on one side to train pipe pressure and on its opposite side to a different pressure and arranged to be acted upon by train pipe pressure to open the large passage and to be returned to close the passage upon equalization of train pipe pressure with the pressure upon its opposite face.

28. A triple valve having a main movable abutment actuated by variations in train pipe pressure, a valve mechanism actuated by said abutment and arranged so that upon service reductions in train pipe pressure fluid pressure is admitted rapidly from the auxiliary reservoir to the brake cylinder and upon emergency reductions of train pipe pressure fluid pressure from the auxiliary reservoir is admitted slowly to the brake cylinder, and means operating independently of the main abutment and its valve mechanism and arranged to be actuated by sudden reductions in train pipe pressure to vent the train pipe through a relatively large orifice.

29. A triple valve having a main movable abutment actuated by variations in train pipe pressure, a valve mechanism actuated by said abutment and arranged so that upon service reductions in train pipe pressure fluid pressure is admitted rapidly from the auxiliary reservoir to the brake cylinder and upon emergency reductions of train pipe pressure fluid pressure from the auxiliary reservoir is admitted slowly to the brake cylinder, and means operating independently of the main abutment and its valve mechanism and arranged to be actuated by sudden reductions in train pipe pressure to vent the train pipe to the brake cylinder through a relatively large passage.

30. A triple valve having a main movable abutment actuated by variations in train pipe pressure, valve mechanism actuated by said abutment and arranged so that upon service reductions in train pipe pressure fluid pressure is admitted rapidly from the auxiliary reservoir to the brake cylinder and upon emergency reductions in train pipe pressure the auxiliary reservoir pressure is admitted slowly to the brake cylinder, and a supplementary abutment subject directly to train pipe pressure and operating independently of the main triple valve abutment and arranged to be actuated by sudden reductions in train pipe pressure to vent the train pipe through a relatively large passage.

31. A triple valve having a main movable abutment actuated by variations in train pipe pressure, valve mechanism actuated by said abutment and arranged so that upon service reductions in train pipe pressure fluid pressure is admitted rapidly from the auxiliary reservoir to the brake cylinder and upon emergency reductions in train pipe pressure the auxiliary reservoir pressure is admitted slowly to the brake cylinder, and a supplementary abutment subject directly to train pipe pressure and arranged to be operated by sudden reductions in train pipe pressure independently of the main movable abutment to vent the train pipe to the brake cylinder through a relatively large passage.

32. A triple valve having a main movable abutment actuated by variations in train pipe pressure, a valve mechanism actuated by said abutment and arranged so that upon service reductions in train pipe pressure the auxiliary reservoir pressure is admitted rapidly to the brake cylinder and upon emergency reductions in train pipe pressure the auxiliary reservoir pressure is admitted slowly to the brake cylinder, and a supplementary abutment controlling a vent from the train pipe, said supplementary abutment being subject on one side directly to train pipe pressure and on the other side to a trapped pressure whereby upon sudden reductions in train pipe pressure the supplementary abutment is moved to vent the train pipe through a relatively large passage, and a restricted equalizing connection between the two sides of the abutment arranged to permit the trapped pressure to equalize with the train pipe pressure upon service reductions in train pipe pressure so that the abutment is not moved under service reductions in train pipe pressure.

33. A triple valve having a main movable abutment actuated by variations in train pipe pressure, a valve mechanism actuated by said abutment and arranged upon service reductions in train pipe pressure to admit pressure from the auxiliary reservoir to the brake cylinder and upon emergency reductions in train pipe pressure to admit fluid pressure from the auxiliary reservoir to the brake cylinder at a different rate than upon service reductions of train pipe pressure, means operating independently of the main movable abutment and valve mechanism arranged so that upon sudden reductions in train pipe pressure the train pipe pressure is vented through a relatively large passage.

34. A triple valve having a main movable abutment actuated by variations in train pipe pressure, a valve mechanism actuated by said abutment and arranged upon service reductions in train pipe pressure to admit pressure from the auxiliary reservoir to the brake cylinder and on emergency reductions of train pipe pressure to admit fluid pressure from the auxiliary reservoir to the brake cylinder at a different rate than upon service reductions of train pipe pressure, means operating independently of the main movable abutment and valve mechanism arranged to vent the train pipe pressure to the brake cylinder through a relatively large passage.

35. A triple valve having a main movable abutment actuated by variations in train pipe pressure, a valve mechanism actuated thereby and arranged so that upon service reductions in train pipe pressure auxiliary reservoir pressure is admitted to the brake cylinder through a relatively large opening and upon emergency reductions in train pressure auxiliary reservoir pressure is admitted to the brake cylinder through a relatively small opening, and emergency mechanism operating independently of the main abutment and its valve mechanism arranged to be actuated by sudden reductions in train pipe pressure to vent the train pipe pressure but to prevent such venting under service reductions in train pipe pressure irrespective of the action of the main movable abutment.

36. A triple valve having a main movable abutment actuated by variations in train pipe pressure, a valve mechanism actuated by said abutment and arranged so that upon service reductions in train pipe pressure auxiliary reservoir pressure is admitted to the brake cylinder through a relatively large opening and on emergency reductions in train pipe pressure, auxiliary reservoir pressure is admitted to the brake cylinder through a relatively small opening, and an emergency mechanism operating independently of the main movable abutment and valve mechanism and subject directly to train pipe pressure arranged to vent the train pressure directly to the brake cylinder through a large opening upon emergency reductions in train pipe pressure but to prevent such venting under service reductions in train pipe pressure irrespective of the action of the main abutment.

37. A triple valve having a main movable abutment, a valve mechanism actuated by said abutment and arranged so that upon service reductions in train pipe pressure auxiliary reservoir pressure is admitted to the brake cylinder through a relatively large opening, and upon emergency reductions in train pipe pressure the auxiliary reservoir pressure is admitted to the brake cylinder through a relatively small opening, and an emergency mechanism operating independently of the main movable abutment for venting the train pipe pressure through a relatively large passage, said mechanism comprising a supplementary abutment subject directly on one side to train pipe pressure and on the other side to a trapped pressure whereby upon sudden reductions in train pipe pressure the emergency mechanism is operated to vent the train pipe pressure, said emergency mechanism being also arranged so that the trapped pressure equalizes with the brake pipe pressure under service reductions in train pipe pressure to prevent actuation of the emergency mechanism under service reductions.

38. A triple valve having a main movable abutment, valve mechanism actuated by said abutment and arranged so that upon service reductions in train pipe pressure, auxiliary reservoir pressure is admitted to the brake cylinder through a relatively large opening, and upon emergency reductions of train pipe pressure, the auxiliary reservoir pressure is admitted to the brake cylinder through a relatively small opening, and an emergency mechanism operating independently of the main movable abutment for venting the train pipe pressure directly to the brake cylinder through a relatively large passage, said mechanism comprising a supplementary abutment subject directly on one side to train pipe pressure and on the other side to a trapped pressure, whereby upon sudden reductions in train pipe pressure the emergency mechanism is operated to vent the train pipe pressure to the brake cylinder, said emergency mechanism being also arranged so that the trapped pressure equalizes with the brake pipe pressure under service reductions in train pipe pressure to prevent actuation of the emergency mechanism under service reductions.

39. A triple valve having a main movable abutment, a valve mechanism actuated by said abutment and arranged so that upon service reductions in train pipe pressure auxiliary reservoir pressure is admitted to the brake cylinder through a relatively large opening, and upon emergency reductions in train pipe pressure the auxiliary reservoir pressure is admitted to the brake cylinder through a relatively small opening, an emergency mechanism operating independently of the main movable abutment for venting the train pipe pressure through a relatively large passage, said mechanism comprising a supplementary abutment subject directly on one side to train pipe pressure and on the other side to a trapped pressure whereby upon sudden reductions in train pipe pressure the emergency mechanism is operated to vent the train pipe pressure directly to the brake cylinder, said mechanism being also arranged to permit the trapped pressure to equalize with the train pipe pressure under service reductions in train pipe pressure to thereby prevent operation of the emergency mechanism under service reductions irrespective of the action of the main movable abutment.

40. A triple valve having a main movable abutment, a valve mechanism actuated by said abutment and arranged so that upon service reductions in train pipe pressure, auxiliary reservoir pressure is admitted to the brake cylinder, through a relatively large opening, and upon quick service reductions in train pipe pressure the train pipe pressure is vented to the brake cylinder through a restricted passage and upon emergency reductions in train pipe pressure, the auxiliary reservoir pressure is admitted to the brake cylinder through a relatively small passage, and an emergency mechanism operating independently of the main movable abutment and its valve mechanism arranged to vent the train pipe pressure to the brake cylinder through a relatively large passage upon emergency reductions in train pipe pressure but to prevent such venting under service reductions in train pipe pressure irrespective of the action of the main movable abutment.

In testimony whereof, I have hereunto set my hand.

JACOB RUSH SNYDER.

Witnesses:
GLENN H. LERESCHE,
A. E. JOHNSON.